May 5, 1970     J. C. STRICKLAND     3,510,087
AIR COUPLING SYSTEM FOR HELICOPTERS
Filed May 6, 1968     2 Sheets-Sheet 1
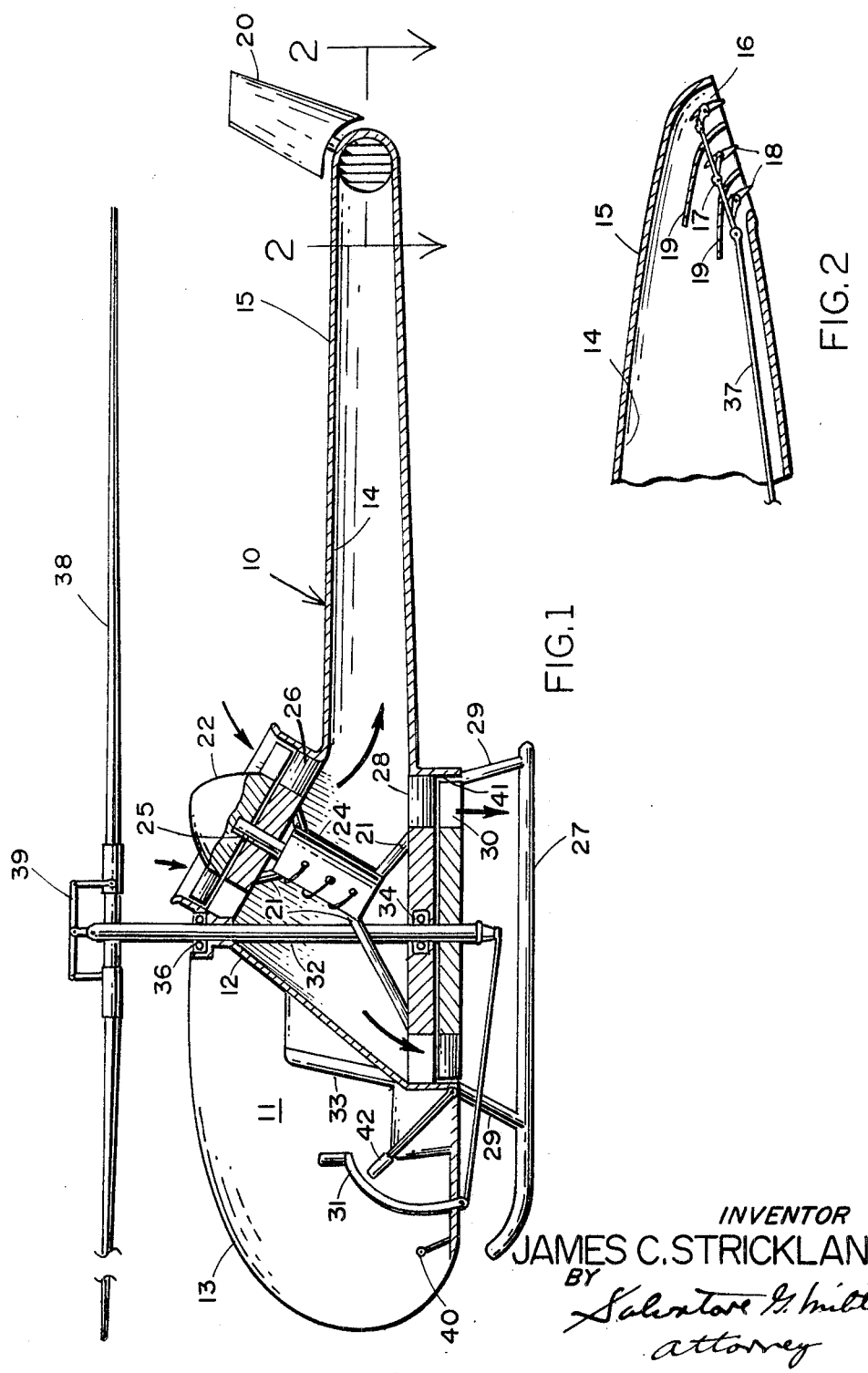
INVENTOR
JAMES C. STRICKLAND
BY
Salvatore G. Militano
attorney May 5, 1970     J. C. STRICKLAND     3,510,087

AIR COUPLING SYSTEM FOR HELICOPTERS

Filed May 6, 1968     2 Sheets-Sheet 2

INVENTOR
JAMES C. STRICKLAND
BY
Salvatore G. Militana
attorney

United States Patent Office 3,510,087
Patented May 5, 1970

3,510,087
AIR COUPLING SYSTEM FOR HELICOPTERS
James C. Strickland, 951 SW. 45th Ave.,
Miami, Fla. 33134
Filed May 6, 1968, Ser. No. 726,759
Int. Cl. B64c 27/82
U.S. Cl. 244—17.19                     5 Claims

ABSTRACT OF THE DISCLOSURE

An air coupling system for helicopters having a main duct, a pressure fan powered by an engine mounted in the top portion of the main duct, straightening vanes mounted below the fan, a rotor shaft extending through the main duct and having a lift rotor mounted at one end and connected to a turbine at the other end whereby air passing through the main duct rotates the lift rotor to operate the helicopter, and a converging duct communicating with the main duct and extending to the tail section of the helicopter for receiving a portion of the air in the main duct, the converging duct having an outlet extending at an angle with the axis of the converging duct whereby a torque is created equal and opposite to the torque of rotating turbine.

---

This invention relates generally to aircraft and is more particularly directed to an air coupling or transmission system for helicopters.

The present helicopters that utilize air couplings have been careful to avoid the creating of any torque on the fuselage and therefore, have relied solely on the reaction drive principle. This dictates that high transmission efficiency can be achieved only at the expense of using unusual and relatively large structures capable of ejecting large air mass flows at a significant fraction of rotor radius. The present invention contemplates the using of air coupling in which torque is present, which torque is corrected by ejecting a small portion of the air mass flow at the tail of the helicopter in a direction to counteract the torque created by the air coupling mechanism. By ejecting the larger portion of air mass flow downwardly after passage through the turbine, to create a direct lift independent of the rotor lift, the overall efficiency is improved and can compare favorably to a mechanically coupled system.

Therefore, a principal object of the present invention is to provide an air coupling system for helicopters that is simple and compact in construction, inexpensive in cost and whose operating efficiency is nearly equal to that of the conventional expensive and complicated mechanical transmission type helicoptes.

Another object of the present invention is to provide an air coupling system for helicopters in which, because of the desire to use an efficient, compact turbine, a torque is present, which torque is corrected by a side facing tail eject port. The combination of an impulse turbine, tail eject port, and ejection of the air mass flow in such a manner to create a direct lift independent of the rotor lift effects a high overall efficiency.

A further object of the present invention is to provide a helicopter which eliminates the highly undesirable cross-coupling effect found in tail-rotor type helicopters wherein every change of rotor lift causes large changes in the required torgue correction necessitating the coordinated actuation of yaw-axis control.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

FIG. 1 is a longitudinal cross sectional view of a helicopter constructed in accordance with my invention.

FIG. 2 is a fragmentary cross sectional view taken along the line 2—2 of FIG. 1.

Figure 3:
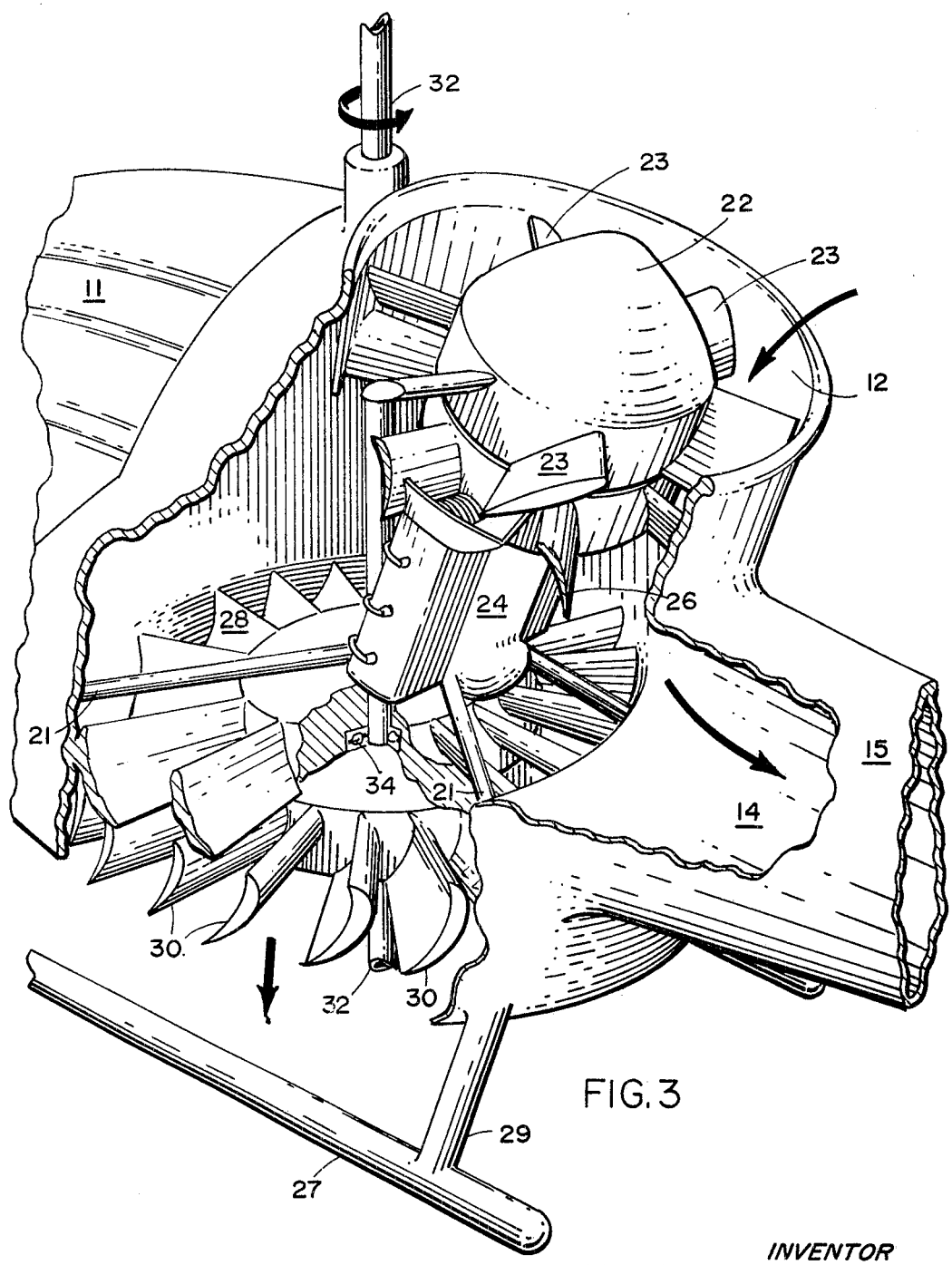
FIG. 3 is a fragmentary perspective view with parts broken away of the power system of my helicopter.

Referring to the drawings wherein like numerals are used to designate similar parts throughout the several views, the numeral 10 refers to a helicopter embodying my invention consisting of an obliquely diverging duct 12 mounted at approximately amidship of the helicopter 10 communicating with a converging tail duct 14 formed in the tail section 15. Forward of the duct 12 is the conventional cockpit 11 enclosed by a transparent windshield 13.

At the top of the divergent duct 12 is a multibladed fan 22 having blades 23 and mounted on an engine shaft 25 extending upwardly of an engine 24. The engine 24 and shaft 25 are mounted axially of the divergent duct 12 and are supported by struts 21. Immediately below the fan 22 there is located a set of straightening vanes 26 whereby the rotary whirl of the air caused by the fan blades 23 and forced therethrough is removed and the static pressure increased slightly. Below the straightening vanes 26, the air flow is divided in a ratio of approximately 6 to 1, whereby 6 parts of the air flows coaxially along the divergent duct 12 and one part flows into the converging tail duct 14 by virtue of the increased static pressure.

At the lower or discharge end 41 of the divergent duct 12 is a turbine formed by a plurality of stator vanes 28 secured to the side wall of the duct 12 and a plurality of substantially symmetrically bladed turbo-buckets 30 secured to a rotary shaft 32. The shaft 32 which is journalled in bearings mounted on bearing supports 34 and 36 extends vertically and terminating above the helicopter where a conventional rotor blade 38 is mounted along with the usual rotor blade adjusting mechanism 39 necessary for directional control of the helicopter 10.

The converging duct 14 diminishes in its cross sectional area along the tail section 15 toward the outlet opening 16 which is faced slightly less than 90° from the axis of the converging duct 14. Consequently, air passing through the converging duct 14 will accelerate in velocity and turned approximately 90° in direction as it is discharged through the outlet port 16. Mounted across the outlet port 16 is a plurality of air flow modulators or vanes 18 mounted on pivot pins 19 for pivotal movement of the vanes 18 to control the flow of air therealong. Fixed vanes 19 secured to the side walls of the tail section 15 in proximity of the outer port 16 cooperate with the adjustable vanes 18 for controlling the flow of air therethrough. Adjustment of the vanes 18 is accomplished by actuation of a foot pedal 40 which is connected to an operating linkage 37 that extends rearwardly of the helicopter 10 to the vanes 18. A slide bar 17 is pivotally secured to each of the vanes 18 so that sliding movement of the slide bar 17 causes a pivotal movement of each of the vanes 18. The end of the linkage 37 is secured to the slide bar 17 whereby actuation of the foot pedal 40 will cause the air flow modulators to pivot about their pivot pins 19 and control the amount of air being discharged through the side facing outlet port 16. The linkage 37 is also connected (not shown) to operate a conventional rudder 20 mounted on the tail 15. This construction assures directional (yaw) control of the helicopter 10 in the event of reduced or non-operation of the engine 24.

The helicopter 10 is provided with conventional skids 27 secured thereto by struts 29. As in all aircraft, the helicopter 10 is provided with operating lever or sticks 31 and 42 mounted in the cockpit 11 forward of and beside the pilot's seat 33. The sticks 31 and 42 are connected in the usual manner by suitable lever and linkages to mechanism (not shown) extending axially of the rotor shaft 32 and connected at its upper end to the rotor blade adjusting mechanism 39.

In the normal operation of my helicopter 10, upon starting the engine 24, the fan 22 will rotate and air will be inducted past the straightening vanes 26 and into the main duct 12 with most of its rotary swirl removed. The air flow along the main duct 12 cooling the engine 24 with one-seventh of the mass of air flowing into converging duct 14 while the remainder of the air continues to flow downwardly increasing in static pressure as velocity is lost in the diverging duct 12. At the bottom of the diverging duct 12, the airflow encounters the fuselage mounted stator values 28. Here the potential energy of static pressure is converted to kinetic energy in the form of a high velocity helical vortex flow. This predeflected rotary air mass flow then impinges on the substantially symmetrically bladed turbo-buckets 30 where most of the air's kinetic energy is reconverted to rotary motion. The rotating turbine blades 30 causes the rotation of the drive shaft 32 and the helicopter rotor 38.

As the air leaves the main duct 12 at the lower or discharge end 41, the air still has an axial velocity component which is found to be approximately 25% of the stator nozzle exit velocity. Since the air mass flow is larger (being approximately 3 to 4 slugs/sec. for a small two passengers craft) the ejection of this air effects a direct lift to the helicopter independent of the rotor lift. It appears that the magnitude of this lift is about 10% to 15% of the gross weight of the helicopter.

In passing over the stator vanes 28, the air mass flow encounters a momentum change reflecting as a torque on the stator blades 28 and of course on the fuselage 10 itself. This torque which must then be compensated in order that the helicopter 10 be flyable, is in fact compensated by discharge of air by the ejection port 16 in the tail section 15. That portion of air which leaves the main duct 12 and flows through the converging duct 14 is accelerated by virtue of the convergent shape of the duct 14 to reach the same velocity as that at the discharge of the stator vanes 28. At the very end of the duct 14 the air passing therethrough is deflected approximately 90 degrees as best shown by FIG. 2 and ejected through the discharge opening 16 past the flow modulators 18. The resulting vector momentum change produces a force which is multiplied by the distance measured from the rotor shaft 32 to the tail eject port 16 represents the torque equal and opposite to that produced by deflection of the main body of air mass flow by the stator vanes 28. A tail duct flow of 1/6 of the stator flow is required because the radius of the discharge port 16 is six times larger than the average stator vane (28) radius. To obtain an exact torque balance for all conditions of flying, all that need be done is actuate the foot pedal 40 to adjust the position of the vanes 18 which in turn controls the quantity of air being discharged at the side facing discharge port 16.

What I claim as new and desire to secure by Letters Patent of the United States is:

1. An air coupling system for helicopters comprising a body member and a tail section, having a main duct extending through top and bottom portions of said body member, air propelling means mounted in the top portion of said main duct directing air into said main duct, power means operatively connected to said air propelling means, a turbine having impulse vanes and stator vanes mounted in the bottom portion of said main duct, a rotor shaft secured at its lower end to said impulse vanes and having a lift rotor mounted on the other end above said body member whereby air passing through said turbine rotates said lift rotor and upon being discharged through said bottom portion of said body member provides said helicopter with a further lift, said helicopter having a further duct extending through said tail section and communicating with said main duct between said air propelling means and said turbine whereby a certain portion of said air propelled through said main duct passes into said further duct, said further duct having an outlet positioned at an oblique angle with an axis of said further duct whereby air discharged through said outlet creates a torque substantially equal and opposite that created by said turbine stator vanes.

2. The structure as recited by claim 1 wherein said air propelling means comprises a fan, and a plurality of straightening vanes mounted adjacent thereto for removing the swirl from said air propelled therethrough.

3. The structure as recited by claim 2 wherein said main duct extends at substantially an oblique angle with the vertical axis of said body member and said rotor shaft extends substantially parallel to said vertical axis with said lower end extending to the midportion of said main duct.

4. The structure as recited by claim 3 taken in combination with adjustable air flow modulators mounted at said outlet and means adjusting said air flow modulators for controlling the flow of air discharged therethrough.

5. The structure as recited by claim 1 wherein said volume flow of air through said further duct is proportionate to the total volume flow through said main duct as the radius of said outlet bears to the average radius of said stator vanes.

References Cited

UNITED STATES PATENTS

| | | | |
|---|---|---|---|
| 2,518,697 | 8/1950 | Lee | 244—17.19 |
| 2,969,937 | 1/1961 | Trojahn | 244—17.19 |
| 3,116,036 | 12/1963 | Nichols | 244—17.19 X |

MILTON BUCHLER, Primary Examiner

P. E. SAUBERER, Assistant Examiner